United States Patent [19]

Sendor et al.

[11] 4,149,288
[45] Apr. 17, 1979

[54] ULTRASONIC PAPER WELDING

[76] Inventors: Bernard T. Sendor, 608 Blair Dr., Westbury, N.Y. 11590; Mortimer S. Sendor, 80-20 221st St., Queens Village, N.Y. 11427

[21] Appl. No.: 803,753

[22] Filed: Jun. 6, 1977

[51] Int. Cl.² .............. B42C 19/00; B29C 27/08; B32B 31/16
[52] U.S. Cl. .................. 11/1 AD; 156/73.1; 156/227; 156/253; 156/477 B
[58] Field of Search ........... 11/1 AD; 156/73.1, 73.4, 156/227, 253, 477 B, 513

[56] References Cited

U.S. PATENT DOCUMENTS

| | | | |
|---|---|---|---|
| 3,560,290 | 2/1971 | Sendor et al. | 156/227 |
| 3,627,602 | 12/1971 | Van Dijk | 156/73.1 |
| 3,733,238 | 5/1973 | Long et al. | 156/73.1 X |
| 4,041,883 | 8/1977 | Meratti | 156/253 X |

*Primary Examiner*—Travis S. McGehee
*Attorney, Agent, or Firm*—Roy C. Hopgood; John M. Calimafde; Charles W. Neill

[57] ABSTRACT

This invention provides a method and aparatus for welding together paper sheets, more especially for, but not limited to, bookbinding. The sheets are held in a desired relation with one another, and the portions to be connected are held together while subject to ultrasonic vibration which fuses ingredients of the paper so as to weld the fused areas together. A folded sheet can be welded across a midportion thereof and then folded along the weld or parallel to the weld to make a signature for a book; or stacked sheets can be bound together along their rearward edge portions by the ultrasonic vibrations.

17 Claims, 10 Drawing Figures

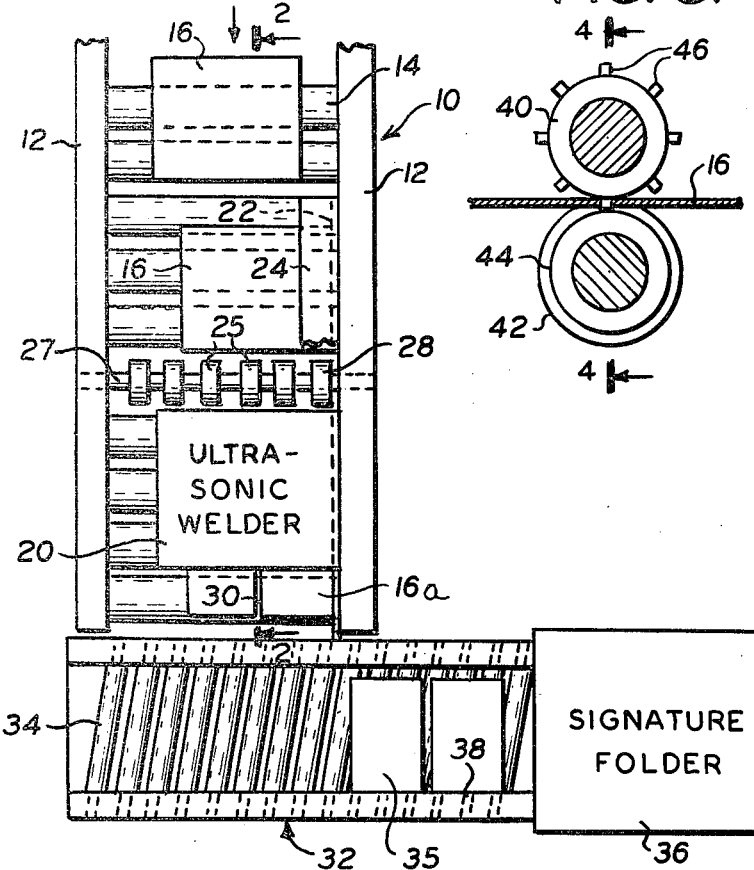

ically-operated apparatus, which is conventional, and the
ULTRASONIC PAPER WELDING

BACKGROUND AND SUMMARY OF THE INVENTION

The principal object of this invention is to reduce the cost of manufacturing books and related products and at the same time produce an equal or stronger book or product. Important factors in the binding of such books are to improve methods of adhering sheets; to simplify production; and to reduce the number of operations necessary and the amount of highly skilled help.

We have discovered that equally strong, or stronger, binding can be done by holding the paper leaves together and subjecting them to ultrasonic vibration over areas of the leaves that are to be secured to one another.

In order to weld paper, which is a cellulosic product, it is necessary that the paper include, as one of its ingredients, a material such as a plastic, which will fuse at a temperature lower than the charring temperature of the cellulosic portion of the paper. The way in which the pressure is applied, or is necessary, depends upon whether the leaves are stationary during the welding operation or whether they are travelling continuously and with relative movement with respect to the welding station.

Another consideration is whether the connection is made along a line on which the paper is to be folded, as when welding a signature, or whether the weld is made along the spine portion of the leaves.

In either case, the vibration is produced by electrically-operated apparatus, which is conventional, and the energy is applied through an energy director, commonly referred to as a "horn," which localizes the vibrations so that they are confined to the portion of the paper which is to be connected together. If the paper has no movement with respect to the horn during the welding operation, the pressure can be applied by the horn against one side of the stack of leaves, and the other side of the stack can rest on an anvil, which can be provided with a depression if folded leaves are to be welded. A depression facilitates folding after welding.

When the paper is moving and being welded, the space between the horn and anvil (gap) must be set reasonably accurately. When properly set, the anvil need not be rotary, but can be stationary. When the proper gap is set and the ultrasonic means are in operation, a conveyor transports the paper to the horn and anvil for welding. If the ultrasonic means is not in operation, the paper will not pass between the horn and anvil when the gap is adjusted for normal operation.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view of apparatus for welding signatures in conjunction with a signature folder;

FIG. 2 is a diagrammatic sectional view taken on the line 2—2 of FIG. 1;

FIG. 3 is an enlarged sectional view showing a portion of FIg. 2 on a larger scale;

FIG. 4 is a sectional view taken on the line 4—4 of FIG. 3;

FIG. 5 is an enlarged view of the portion of the structure shown in FIG. 2 where the horn applies the ultrasonic vibration to the leaves of the signature as they pass under the horn, the section shown in FIG. 5 being taken on the line 5—5 of FIg. 6;

FIG. 6 is an end view, partly broken away and in section, of the apparatus shown in FIG. 5;

FIG. 7 is a diagrammatic view showing the welding of a signature between a horn and anvil with no movement of the horn along the length of the seam during the welding operation;

FIG. 8 is a sectional view taken on the line 8—8 of FIG. 7;

FIG. 9 is a view of a modification which is substantially a reversal of FIG. 7; and FIG. 10 is an isometric view of another modification of the invention.

DESCRIPTION OF PREFERRED EMBODIMENT

FIG. 1 shows a conveyor 10 having side frames 12 and a plurality of supports 14 which provide the surfaces of the conveyor along which assembled sheets of paper 16 travel.

The first group of sheets 16 at the upper end of FIG. 1 may be placed on the conveyor 10 in a centered position. The conveyor has rollers 14 which rotate in a direction to move the sheets of paper 16 toward a welder 20 located over the conveyor 10 and capable of applying ultrasonic vibrations to the paper in a manner which will be explained. Apparatus for producing the ultrasonic vibration is not illustrated, since such equipment is well known and can be purchased in the open market. A belt or tape conveyor can be used instead of rollers.

The apparatus shown in FIG. 1 is constructed in such a way as to make a connection between the assembled sheets of paper 16 along a center region midway between opposite sides of the sheet, and this region extends transversely of the center line on which the assembled sheets 16 are intended to be folded in order to constitute a signature for a book.

There is a guide surface 22 shown on one side of the conveyor in position to contact with the right-hand edges of each assembly of sheets of paper 16 as they move along the conveyor toward the welder 20. The guide can be positioned either on right or left side of machine. Of course, angle of tape or rollers conveying sheets of paper must be correspondingly adjusted. This guide 22 extends upward for a short distance above the top of the rolls and then extends to form a top guide 23 which holds the successive assembled sheet units 16 down on the conveyor as they travel towards the welder 20. Other rolls 28 supported by an axle 27 are a part of the conveyor 10. Each assembled sheet unit 16 can be pushed to the right into contact with the guide 22 and under the overlying guide 23 by hand, but the rollers 14, or conveyor tape assembly, are preferably canted so that they move each assembled sheet unit 16 toward the right as it travels toward the welder, thus eliminating any necessity for manual feeding of the assembled sheets 16.

The conveyor supports under in the immediate vicinity of the ultrasonic welder 20 are preferably of special construction. A support or anvil 26 (FIG. 2) at the welding station is preferably a stationary bar, with the axis extending transversely of the direction of movement of the paper through the welding station. The support can also be parallel to direction of movement.

The top surface of the support 26 is flat or slightly rounded about an axis of curvature extending transversely of the direction of movement of the paper.

FIG. 1 also shows a signature 16a which has been welded along a midportion, the weld region being indicated by the reference character 30. The welded signature 16a is delivered by the conveyor 10 to a cross-conveyor 32 having rolls 34 which are driven by power means (not shown) to carry welded signatures, one of which is designated by the reference character 34, to a signature folder 36.

The rollers 34 of the conveyor 32 are canted so as to move the signature 34 into contact with a guide rail 38, so that each successive signature enters the signature folder 36 along the same line.

In the signature folder, the signatures are folded along the welded region 30 by conventional folding apparatus which is well known and which need not be illustrated for a complete understanding of the invention.

FIG. 1 shows a folded signature 16c which has been delivered from the signature folder 36.

FIG. 2 shows the ultrasonic welder 20 which has a horn 38 extending down from the portion of the welder 20 which imparts ultrasonic vibration to the horn. The horn 30 is shaped so as to concentrate the vibrations in a smaller and more concentrated space, and the lower end of the horn 38 contacts with each unit of assembled sheets such as the unit 16a.

In the preferred embodiment of the invention, the first operation performed on the assembled sheets of paper 16 is a perforating or slitting operation which occurs as the assembled sheets pass between a rotary perforator 40 and a grooved roller 42 which holds the assembled sheets of paper in contact with the perforator. FIGS. 3 and 4 show the perforator in more detail. The assembled sheets of paper 16 are supported by the grooved roller 42, as shown in FIGS. 3 and 4. There is a circumferential groove 44 in vertical alignment with radially extending and angularly spaced cutters 46 that project from the perforator roller 40. The distance between slits may be greater than the length of the slits. Scoring can be used in place of perforating.

The perforations are along the region of the signature where the paper is to be folded; and the paper is welded along regions on both sides of the region where the sheets are to be folded. The unwelded paper between the regions of welding facilitates the folding of the paper; and spaced perforations along the fold region make neater folds and have other favorable effects upon the welds. Like the other rolls of the conveyor 10, the rotary perforator 40 and grooved roller 42 are power-driven through motion-transmitting means (now shown). if the number of sheets is too great, the perforating can be optional.

FIGS. 5 and 6 show the horn 38 against which the assembled sheets of paper 16 are held by the support 26 which has flanges 50. There are two flanges 50 on the support 48, and these flanges are spaced apart for a short distance to leave the unwelded region for folding the paper. The space between the flanges 50 is a groove 52. Welding of the assembled sheets of paper 16 occurs along the lines where the flanges 50 are immediately below the lower part of horn 38. This is a refinement of a solid anvil with no flanges.

The support 26 can be moved toward and from the horn by adjustment means 53 shown diagrammatically in FIG. 2 as a screw 54 threaded through a fixed frame 55. The support 26 serves as an anvil under the horn, and it is necessary to have the gap between the horn and anvil properly correlated with the thickness of the paper stack for good results. The gap is preferably close enough so that the paper cannot be pushed through the gap when the horn is not vibrating. We have found that the horn will feed the paper through the gap when the horn is energized.

The welding method thus far described makes ultrasonic welds while the assembled sheets of paper are in continuous movement. Such a method is referred to as "scanning." FIGS. 7 and 8 show a modified form of the invention in which a signature 70 is welded by a horn 72 which extends downward from vibration-producing apparatus in the same way as in FIGS. 1 and 2. The signature 70 does not move while being welded, however, but has the region to be welded placed in a fixed position on the anvil, and the horn or anvil is moved with respect to the other to bring the horn into contact with the paper long enough to make a weld and then back away from the paper. Such a method is referred to as "plunging"; and the horn used for plunging has a much longer face that contacts with the paper, so that a substantial length of weld can be made with each plunge. FIGS. 7 and 8 show the anvil 78 with a groove or depression 76 into which a fold of the paper extends. Welds can be made by plunging, even though the anvil is flat.

There are advantages in folding the sheets before welding them, since this permits the signature or a leaflet to have a sharp fold and to be welded at the fold itself instead of on both sides of the fold as in FIGS. 5 and 6. In FIGS. 7 and 8, the sheets are folded before welding and welded at the fold.

FIG. 9 shows an anvil support 82 that is pointed to support the seam from the inside, instead of from the outside as in FIG. 7. Other structure of FIG. 9 corresponding to FIG. 7 is indicated by the same reference characters welding and then welded along the seam, as in FIG. 9, the procedure is referred to as "saddle welding."

FIG. 10 shows a method by which pages 86 of a book can be welded together without any fold or by which signatures of the book can be welded together. The pages 86 are held together in a clamp having an upper jaw 88 and a lower jaw 90. The pages 86 have rearward edges 92 which may have no folds or which may be the folds of successive signatures which are to be welded together. In either case, the pages are placed in the gap between a horn 72a and an anvil 26a.

When the horn 72a is energized, the confronting faces of all of the sheets 86 between the horn 72a and the anvil 26a are heated by the hysteresis caused by the supersonic vibration and the pages are welded together as in the methods described in connection with the previous figures of the drawing.

Experience has shown that a 16-page signature of suitable paper can be welded with a horn vibrating through a stroke of 0.015 inches at a frequency of 20,000 mH with the force against the side of the paper opposite the horn (i.e., force against anvil) being 100 pounds. This example is given merely by way of illustrative example.

The preferred embodiment of the invention has been illustrated and described, but changes and modifications can be made and some features can be used in different combinations without departing from the invention as defined in the claims.

What is claimed is:

1. The method of bookbinding which comprises bringing together stacked sheets of paper comprising pages to be bound together as a book, said paper containing an ingredient that fuses at a temperature less than the charring temperature of cellulose in the paper, locating the sheets of paper in a stack with the pages in a desired order with respect to one another, holding the sheets with the pages in such order and while so held pressing the sheets together along the edge regions at which the rearward portions of the pages are to be bound together, exerting a localized pressure at said edge regions on one side of the stack of assembled sheets by a horn, and on the opposite side of the assembled sheets from the horn exerting pressure by an anvil, subjecting the horn to ultrasonic vibration to produce high frequency pressure impulses that heat the paper and weld together areas of contact of the paper between the horn and anvil, terminating the ultrasonic impulses before the paper is heated to a charring temperature and binding successive stacks along corresponding edge regions with the pages beyond said edge regions unconnected to one another.

2. The method described in claim 1 characterized by the sheets being leaves of cellulose paper folded to form a book signature, and exerting the pressure against the pages along a region where pages on one side of the signature join those on the other side of the signature, to bind the signature together along its midportion before folding, and advancing successive stacks in the direction in which the fold and the weld extend.

3. The method described in claim 1 characterized by making a gap between the horn and anvil that remains substantially constant in width during welding of the sheets, and passing the paper sheets through said gap, by relative movement of the paper with respect to the horn and anvil, in the direction of the length of the bound edges of the pages.

4. The method described in claim 1 characterized by moving the sheets along a conveyor while in assembled relation, maintaining the sheets in their relative positions by a confining guide extending lengthwise of the conveyor, and supporting the paper on an anvil that holds the paper against the horn as the paper travels past the horn with substantially continuous motion.

5. The method described in claim 4 characterized by using an anvil with enough mass to provide resistance against which the ultrasonic vibration compresses the parts that are to be welded together.

6. The method described in claim 5 characterized by holding the anvil against one side of the paper and the other side of the paper against the horn by applying continuous force to the anvil in the direction of the paper.

7. The method described in claim 1 characterized by supporting the paper on a roller conveyor and locating the horn over an anvil between rollers of the conveyor to hold the paper in contact with the horn at a welding region, and advancing the paper along the conveyor and under the horn.

8. The method described in claim 1 characterized by welding the sheets together to form a signature with the sheets on opposite sides of a fold line bound together along narrow regions of the surfaces of the sheets on opposite sides of the fold line but with a narrow unwelded region between the welded regions to facilitate folding of the sheets along the unwelded region after the welding of the welded regions.

9. The method described in claim 8 characterized by cutting perforations through the paper along the region between the welded regions and with the perforations spaced from one another lengthwise of the regions along which the weld is to be made.

10. The method described in claim 9 characterized by making slit perforations with the length of the slits substantially shorter than the distance between slits in the direction in which the line of perforations extends.

11. The method described in claim 1 characterized by using a horn that is as long as the weld that is to be made, and exerting pressure on the sheets of paper by pressing the superimposed sheets against an anvil on the opposite side of the sheets from the horn.

12. The method described in claim 11 characterized by using an anvil that has a groove with sides that flare outwardly as they extend upwardly from the bottom of the groove and with the bottom of the groove of substantial width to provide a band width for folding the sheets at the weld line.

13. The method described in claim 1 characterized by folding the paper before welding, placing an anvil into the fold of the paper with one end of the anvil narrow enough to hold the paper at the fold in contact with the horn, and welding the paper at the fold.

14. The method described in claim 13 characterized by using a horn substantially as long as the fold, and making the weld for substantially the full length of the fold by a single stroke of the horn and anvil toward one another.

15. The method described in claim 14 characterized by locating the anvil below the fold with the paper draped over both sides of the anvil, and bringing the horn into contact with the paper on the side of the paper opposite to the anvil.

16. The method of welding sheets together which comprises bringing together sheets containing material that fuses at a temperature less than the charring temperature of the sheets, locating the sheets in a desired relation to one another, holding the sheets in such relation while supported by a stationary anvil, pressing the sheets together and holding them against the stationary anvil by means of a vibrating horn, subjecting the horn to ultrasonic vibration to produce high frequency pressure impulses that heat the sheets between the horn and anvil, moving the sheets progressively across a space between the horn and anvil to weld the sheets together along their direction of movement with respect to the horn and anvil, characterized by adjusting the spacing of the horn and anvil with respect to the thickness of the sheets so that the sheets are firmly clamped and the vibration of the horn produces the progressive movement across the space between the horn and anvil.

17. Apparatus for binding books including in combination a conveyor for advancing a stack of assembled sheets to a welding station, ultrasonic welding apparatus comprising a horn for contact with the paper at the region to be welded, means for imparting ultrasonic vibration to the horn, means for perforating the assembled paper sheets along a region to be folded, a back-up anvil on the opposite side of the stack of paper from the horn and with surfaces on both sides of the region of perforating, and means for moving the anvil toward and from the horn to obtain a predetermined gap between the anvil and the horn through which the paper passes to be welded together.

* * * * *